US009812256B2

(12) United States Patent
Yang et al.

(10) Patent No.: US 9,812,256 B2
(45) Date of Patent: Nov. 7, 2017

(54) COIL ASSEMBLY

(71) Applicant: SAMSUNG ELECTRO-MECHANICS CO., LTD., Suwon-si (KR)

(72) Inventors: Tae Seok Yang, Suwon-si (KR); Ki Won Chang, Suwon-si (KR); Jae Sun Won, Suwon-si (KR); Hee Seung Kim, Suwon-si (KR); Myung Hyun Sung, Suwon-si (KR); Soon Joung Yio, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/185,804

(22) Filed: Jun. 17, 2016

(65) Prior Publication Data
US 2017/0178802 A1    Jun. 22, 2017

(30) Foreign Application Priority Data
Dec. 18, 2015 (KR) ........................ 10-2015-0181841

(51) Int. Cl.
*H01F 5/00* (2006.01)
*H01F 27/28* (2006.01)
*H01F 38/14* (2006.01)
*H02J 50/10* (2016.01)

(52) U.S. Cl.
CPC ............ *H01F 38/14* (2013.01); *H01F 5/003* (2013.01); *H02J 50/10* (2016.02)

(58) Field of Classification Search
None
See application file for complete search history.

(56) References Cited

U.S. PATENT DOCUMENTS

| 6,501,364 B1* | 12/2002 | Hui | H01F 27/365 336/200 |
|---|---|---|---|
| 2008/0164840 A1* | 7/2008 | Kato | H01F 27/2804 320/108 |
| 2009/0121819 A1* | 5/2009 | Haratani | G01R 33/09 336/221 |
| 2010/0117737 A1* | 5/2010 | Kondo | H03F 1/0272 330/276 |
| 2012/0049991 A1* | 3/2012 | Baarman | H01F 17/0013 336/199 |
| 2012/0187903 A1* | 7/2012 | Tabata | H02J 7/025 320/108 |
| 2012/0274148 A1* | 11/2012 | Sung | H04B 5/0037 307/104 |
| 2015/0123603 A1* | 5/2015 | Yang | H02J 7/025 320/108 |

FOREIGN PATENT DOCUMENTS

| JP | 4947637 B2 | 3/2012 |
|---|---|---|
| KR | 10-1485536 B1 | 1/2015 |

* cited by examiner

*Primary Examiner* — Ronald Hinson
(74) *Attorney, Agent, or Firm* — NSIP Law

(57) ABSTRACT

A coil assembly includes a coil part including stamped coils, and a connection substrate having one end thereof disposed inside the coil part and the other end disposed outside the coil part, wherein one end of each of the stamped coils is connected to a first surface of the connection substrate and the other end connected to a second surface of the connection substrate.

18 Claims, 6 Drawing Sheets

COIL ASSEMBLY

CROSS-REFERENCE TO RELATED APPLICATION(S)

This application claims the benefit under 35 USC 119(a) of Korean Patent Application No. 10-2015-0181841 filed on Dec. 18, 2015, in the Korean Intellectual Property Office, the entire disclosure of which is incorporated herein by reference for purposes.

BACKGROUND

1. Field

The following description relates to a coil assembly that may be used for wireless charging.

2. Description of Related Art

In order to charge secondary batteries that are disposed inside electronic devices such as smart phones and other portable terminals, a system of wireless power transmission and reception may be used.

A wireless charger generally includes a power transmitter that transmits power, and a power receiver that wirelessly receives power and stores the received power.

Most wireless chargers transmit and receive power using electromagnetic induction or resonance. To this end, a coil is provided in each of the power transmitter and the power receiver of a wireless charger to serve as a transmitter coil or a resonant receiver coil.

According to a related art, a circuit pattern forming method is used to form a coil pattern on a substrate. However, in this case, a thickness or a width of the coil pattern may be limited, and thereby the coil pattern may exhibit excessively high resistance loss.

Further, when a plurality of coil patterns are formed on a single substrate, it becomes difficult to lead a terminal to the outside of the coil, thereby increasing manufacturing cost.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a coil assembly includes a coil part including stamped coils, and a connection substrate having one end thereof disposed inside the coil part and the other end disposed outside the coil part, wherein one end of each of the stamped coils is connected to a first surface of the connection substrate and the other end connected to a second surface of the connection substrate.

The connection substrate may include first pads disposed adjacent to the one end of the connection substrate and connected to the stamped coils, second pads disposed adjacent to the other end of the connection substrate and connected to external members, and wiring patterns connecting the first pads and the second pads to each other.

The first pads may be distributed on both sides of the connection substrate, and the second pads may be disposed on only one side of the connection substrate.

The stamped coils may include a first section disposed adjacent to the first surface of the connection substrate in a spiral shape, and a second section that extends from the first section and is disposed adjacent to the second surface of the connection substrate in the spiral shape.

The stamped coils may have a double-layer structure in which the first section and the second section are stacked and are disposed to partially overlap each other.

The stamped coils may include an insulating layer coated on surfaces of the stamped coils in order to secure insulation between the first section and the second section.

The connection substrate may include an insulating substrate interposed between the first section and the second section to secure insulation between the first section and the second section.

The connection substrate may be interposed between the first section and the second section to secure insulation between the first section and the second section, and may include at least one conductive via connecting the first section and the second section to each other.

The connection substrate may include an insulating film and pads disposed on both sides of the insulating film.

The coil part may include a second stamped coil and a first stamped coil disposed in an inner space of the second stamped coil.

In another general aspect, a coil assembly includes a coil part including stamped coils and a connection substrate having one end thereof disposed inside the coil part and the other end disposed outside of the coil part, wherein each of the stamped coils is formed in a double-layer structure including a first section disposed adjacent to a first surface of the connection substrate and a second section disposed adjacent to a second surface of the connection substrate.

The stamped coils may further include a connection part that connects between an end of the first section and an end of the second section.

The connection part may be disposed perpendicular to the first section or the second section.

In another general aspect, a coil assembly includes a coil part including stamped coils stacked in two or more layers, and a connection substrate including a first end disposed outside of the coil part and a second end disposed inside the coil part to connect with one or more ends of the stamped coils, wherein the connection substrate includes a flexible printed circuit board or a film substrate.

The connection substrate may be configured to electrically connect to a secondary battery of an electronic device for wirelessly charging the secondary battery.

The stamped coils may include a first section that extends to a first surface of the connection substrate and a second section that extends to a second surface of the connection substrate.

The general aspect of the coil assembly may further include an insulating substrate interposed between a first section of at least one of the stamped coils and a second section of the at least one of the stamped coils.

In another general aspect, a wireless power receiver includes the general aspect of the coil assembly described above, wherein the coil assembly is configured to serve as a resonant receiver coil for wirelessly charging a portable terminal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience

DETAILED DESCRIPTION

Figure 1:
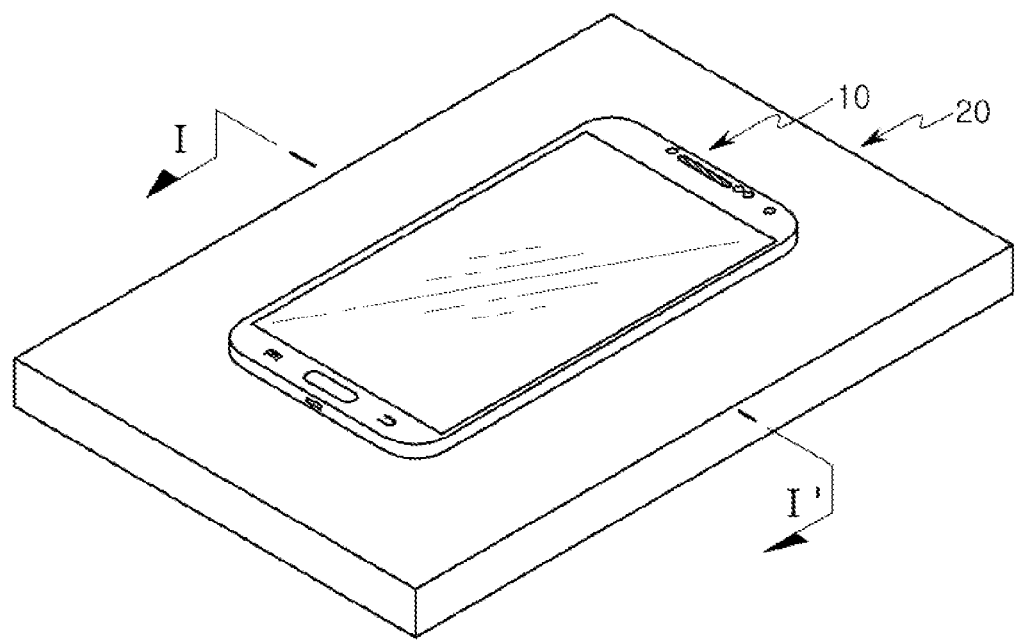
FIG. 1 is a perspective view schematically illustrating an embodiment of an electronic device according to the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the specification, it is to be understood that when an element, such as a layer, region or substrate, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, other elements or layers intervening therebetween cannot be present. Like numerals refer to like elements throughout. As used herein, the term "and/or" includes any and all combinations of one or more of the associated listed items.

Although terms such as "first," "second," and "third," may be used herein to describe various members, components, regions, layers and/or sections, these members, components, regions, layers, or sections are not to be limited by these terms. These terms are only used to distinguish one member, component, region, layer or section from another member, component, region, layer or section. Thus, a first member, component, region, layer or section discussed in examples below may also be referred to as a second member, component, region, layer or section without departing from the teachings of the examples.

Spatially relative terms, such as "above," "upper," "below," and "lower" may be used herein for ease of description to describe one element's relationship to one or more other elements as shown in the figures. It is to be understood that the spatially relative terms are intended to encompass different orientations of the device in use or operation in addition to the orientation depicted in the figures. For example, if the device in the figures is turned over, elements described as being "above" another element or being an "upper" element will then be "below" the other element or will be a "lower" element. Thus, the term "above" can encompass both the above and below orientations depending on a particular direction of the figures. The device may also be oriented in other ways (for example, rotated 90 degrees or at other orientations) and the spatially relative descriptors used herein are to be interpreted accordingly.

The terminology used herein is for describing various examples only and is not to be used to limit the present disclosure. As used herein, the singular terms "a," "an," and "the" are intended to include the plural forms as well, unless the context clearly indicates otherwise. Further, as used herein, the terms "include," "comprises," and "have" specify the presence of stated features, numbers, operations, members, elements, and/or combinations thereof, but do not preclude the presence or addition of one or more other features, operations, members, elements, and/or combinations thereof.

Hereinafter, examples will be described with reference to schematic diagrams. In the drawings, due to manufacturing techniques and/or tolerances, for example, modifications of the shape shown may be estimated. Thus, this examples described herein are not to be construed as being limited to the particular shapes of regions shown herein, but are to be construed as including changes in shape that occur during manufacturing. The features of the examples described herein may be combined in various ways as will be apparent to one of ordinary skill in the art. Further, although the examples described below have a variety of configurations, other configurations are possible as will be apparent to one of ordinary skill in the art.

Figure 2:
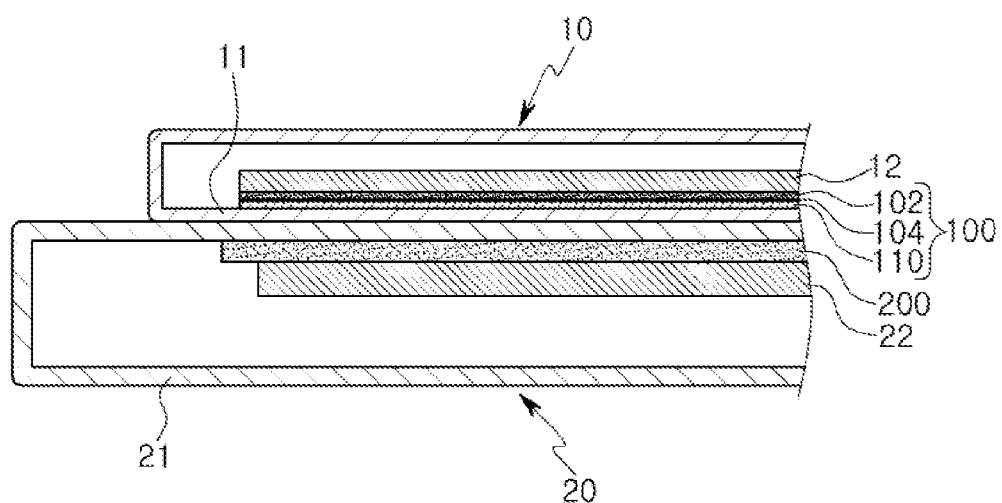
FIG. 2 is a cross-sectional view of an embodiment of an electronic device taken along line I-I' of FIG. 1.

FIG. 1 is a perspective view schematically illustrating an embodiment of an electronic device according to the present disclosure, and FIG. 2 is a cross-sectional view of an embodiment of the electronic device taken along a line I-I' of FIG. 1.

According to one embodiment of the present disclosure, a coil assembly may be used for wirelessly charging an electronic device. The coil assembly may be capable of significantly reducing resistance loss.

Referring to FIGS. 1 and 2, a wireless charger is illustrated with a portable device 10. The wireless charger includes a charging device 20 that wirelessly transmits power. The portable device 10 is an electronic device that wirelessly receives the power and stores the received power.

The portable device 10 includes a battery 12 and a power receiver 100. The power receiver 100 supplies the power received from the charging device 20 to the battery 12 and charges the battery 12 with the power.

The battery 12 may be a chargeable and dischargeable secondary battery. The battery 12 may be attached to and detached from the portable device 10, but the configuration of the battery 12 is not limited thereto.

The power receiver 100 is accommodated in a case 11 of the portable device 10. The power receiver 100 may be directly attached to an inner surface of the case 11 or be disposed to be maximally adjacent thereto.

In this embodiment, the power receiver 100 includes a magnetic part 102 and a coil assembly 110.

The magnetic part 102 has a flat plate shape (or a sheet shape). The magnetic part 102 may be disposed on one surface of the coil assembly 110 to be fixedly attached to the coil assembly 110. The magnetic part 102 may be provided to efficiently form a magnetic path of a magnetic field generated by a coil pattern 113 of the coil assembly 110. To this end, the magnetic part 102 may be formed of a material capable of easily forming the magnetic path. For example, the magnetic part 102 may be formed of a ferrite sheet.

Meanwhile, although not illustrated, a metal sheet may further be added to an outer surface of the magnetic part 102 to shield electromagnetic waves or leaked magnetic flux, as desirable. The metal sheet may be made of aluminum or the like, but a material of the metal sheet is not limited thereto.

In addition, the power receiver 100 according to the illustrated embodiment includes an adhesion part 104 interposed between the coil assembly 110 and the magnetic part 102 so that the coil assembly 110 and the magnetic part 102 are firmly and fixedly adhered to each other.

The adhesion part 104 is disposed between the coil assembly 110 and the magnetic part 102, and adheres the magnetic part 102 and the coil assembly 110 to each other. The adhesion part 104 may be formed of an adhesive sheet or an adhesive tape, and may be formed by applying an adhesive or a resin having adhesive properties to a surface of a substrate 112 or the magnetic part 102. In this example, the adhesion part 104 may contain ferrite powder particles, whereby the adhesion part 104 may have magnetism, together with the magnetic part 102.

In addition, according to the present embodiment, the charging device 20 is provided to charge the battery 12 of the portable device 10 with the power. To this end, the charging device 20 includes a power transmitter 200 in a case 21.

The charging device 20 may convert commercially-available alternating current (AC) power supplied from the outside into direct current (DC) power, and may again convert the DC power back into an AC voltage having a specific frequency to provide the AC voltage to the power transmitter 200. To this end, in the embodiment illustrated in FIG. 2, the charging device 20 includes a voltage converting unit 22 converting the commercially-available AC power into the AC voltage having the specific frequency.

When the AC voltage is applied to the power transmitter 200 in the charging device 20, a magnetic field around the power transmitter 200 may be changed. Therefore, the power receiver 100 of the electronic device 10 disposed to be adjacent to the power transmitter 200 may be supplied with the voltage according to the change in the magnetic field, whereby the battery 12 may be charged.

The power transmitter 200 may be configured similarly to the power receiver 100 described above. Therefore, a detailed description of the power transmitter 200 will be omitted.

Hereinafter, the coil assembly 110 configuring the power receiver 100 will be described in detail.

Figure 3:
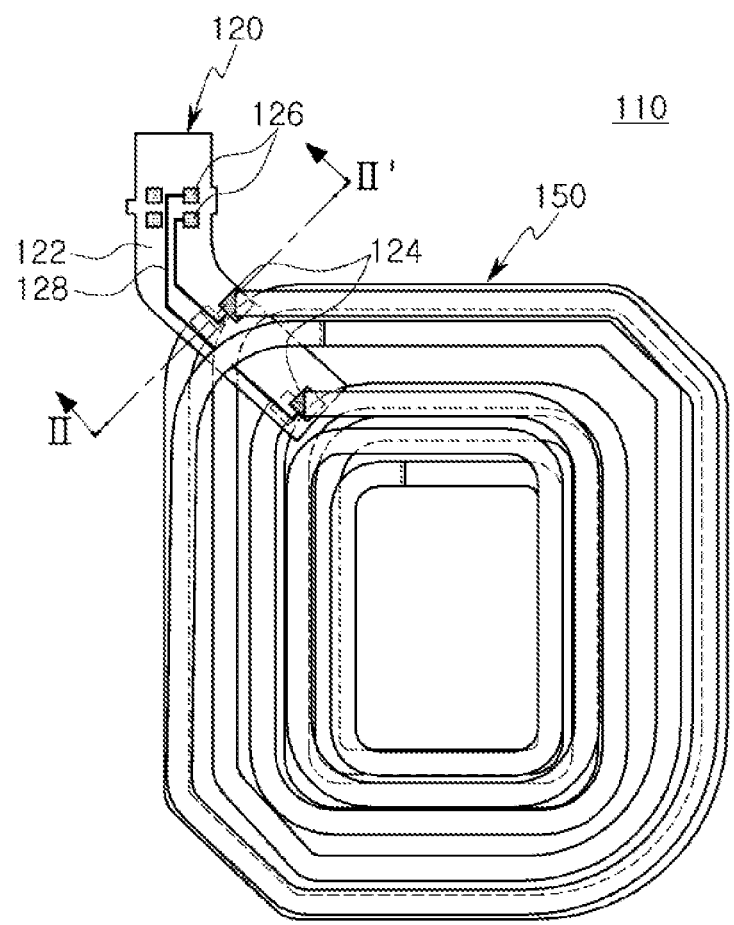
FIG. 3 is a plan view schematically illustrating an embodiment of a coil assembly according to FIG. 2.
Figure 4:
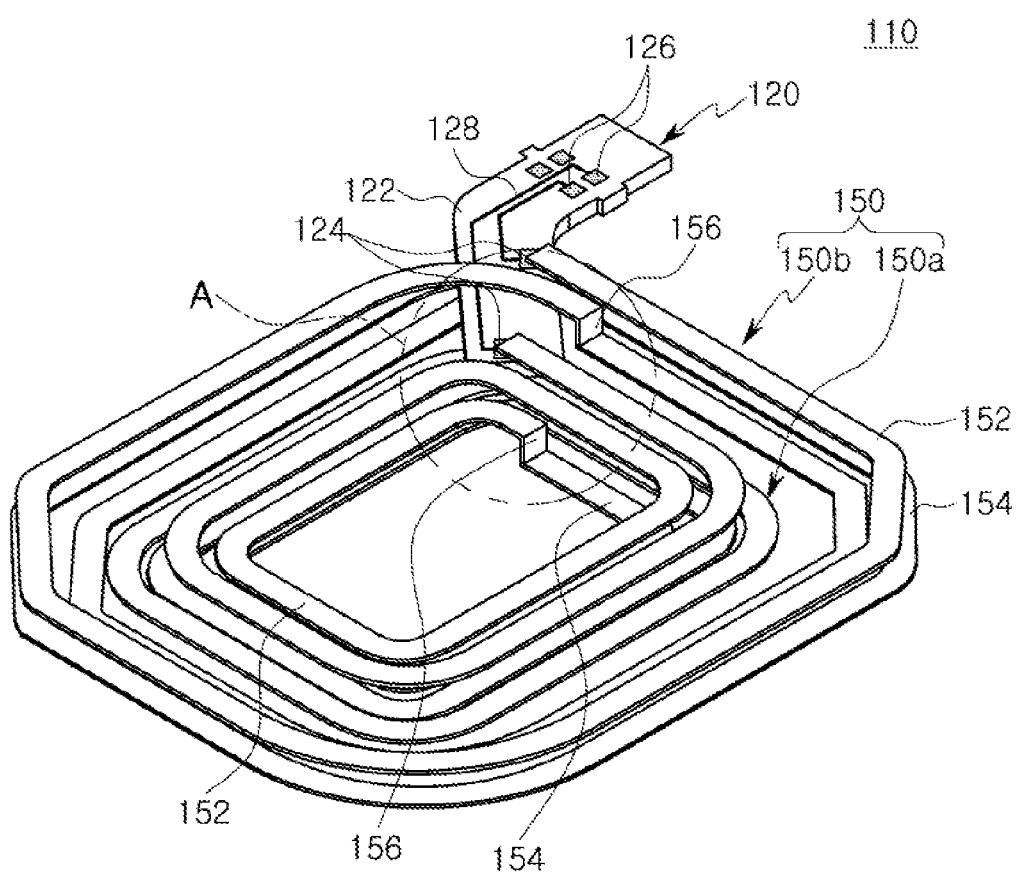
FIG. 4 is a perspective view of an embodiment of a coil assembly illustrated in FIG. 3.
Figure 5:
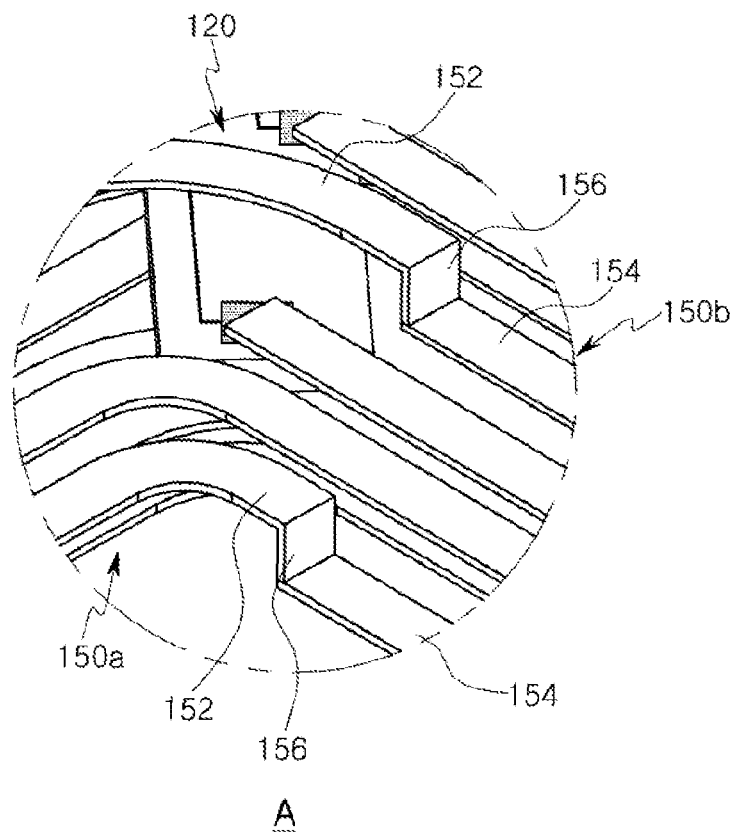
FIG. 5 is a partially enlarged perspective view of an embodiment of a part A of FIG. 3.
Figure 6:
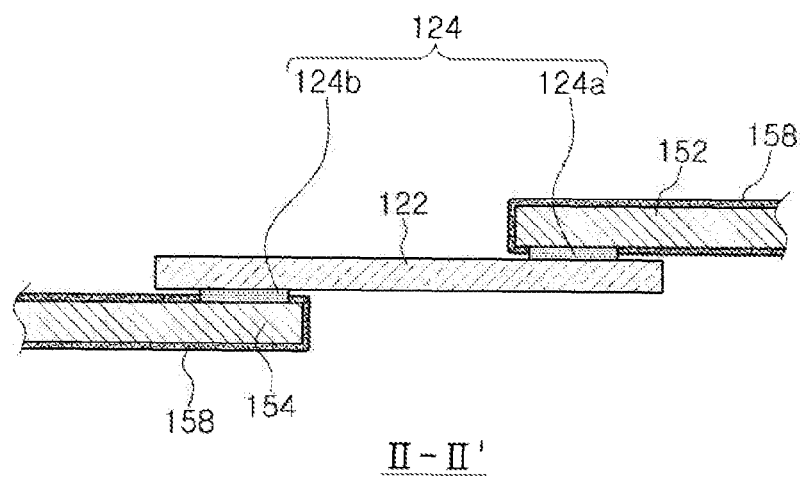
FIG. 6 is a cross-sectional view of an embodiment of a coil assembly taken along line II-II' of FIG. 3.

FIG. 3 illustrates a plan view of an embodiment of a coil assembly according FIG. 2, and FIG. 4 is a perspective view of an embodiment of a coil assembly illustrated in FIG. 3. Further, FIG. 5 is a partially enlarged perspective view of a part A of the coil assembly according to FIG. 3, and FIG. 6 is a cross-sectional view of an embodiment of a coil assembly taken along a line II-II' of FIG. 3.

Referring to FIGS. 3 through 6, the coil assembly 110 includes a coil part 150 and a connection substrate 120.

As the connection substrate 120, a film substrate or a flexible printed circuit board (PCB) may be used. The flexible PCB is a circuit board having a circuit pattern formed on an insulating film 122 (e.g., polyimide) having a reduced thickness (e.g., 10 μm) using a copper foil. However, the connection substrate 120 is not limited thereto. For example, various materials may be used as long as the material may have a reduced thickness, may have flexibility, and may have the circuit pattern formed thereon.

In addition, although an embodiment in which the connection substrate 120 has flexibility is described as an example, a printed circuit board (PCB) having rigidity may be used in another embodiment.

A protection layer (not illustrated) may be formed on the circuit pattern. In addition, a plurality of pads 124 and 126 may be exposed to the outside of the protection layer.

In this embodiment, the pads include first pads 124 to which the coil part 150 is connected and second pads 126 electrically connected to external members such as a battery and a circuit board of the portable device.

One end of the connection substrate 120 is disposed to be adjacent to a center of the coil part 150, and the other end thereof is disposed in a position spaced apart from the coil part 150 by a predetermined distance.

The connection substrate 120 is, for example, provided to lead both ends of a plurality of stamped coils 150a and 150b configuring the coil part 150 to the outside of the coil part 150.

Therefore, in this embodiment, one end of the connection substrate 120 extends to a central portion of the coil part 150 to connect to both ends of the stamped coil 150a disposed in the center of the coil part 150.

In addition, the connection substrate 120 radially extends from the center of the coil part 150, and the other end of the connection substrate 120 penetrates through the coil part 150 to be disposed on the outside of the coil part 150.

The first pads 124 are disposed adjacent to one end of the connection substrate 120, and are connected to the stamped coils 150a and 150b. In addition, the second pads 126 are disposed to be adjacent to the other end of the connection substrate 120.

The first pads 124 and the second pads 126 are formed to correspond to the number of stamped coils 150a and 150b configuring the coil part 150. In a case in which two stamped coils 150a and 150b are provided, as in the illustrated embodiment, four first pads 124 and four second pads 126 may be respectively formed.

In this embodiment, the first pads 124 are disposed through both sides of the connection substrate 120. For example, two first pads 124a of the four first pads 124 are disposed on one surface of the connection substrate 120, and the remaining two first pads 124b are disposed on the other surface of the connection substrate 120.

On the other hand, the second pads 126 may all be disposed on any one surface of the connection substrate 120. This is a configuration for easily connecting the second pads 126 of the connection substrate 120 to another member (e.g., the circuit board, the battery or the like), and the second pads 126 may also be disposed on both sides of the connection substrate 120 according to a structure of another member described above.

The first pads 124 and the second pads 126 are electrically connected to each other by wiring patterns 128 formed on the connection substrate 120. Therefore, the coil part 150 connected to the first pads 124 may be electrically connected to external factors of the coil assembly 110 through the wiring patterns 128 and the second pads 126.

The coil part 150 includes a plurality of stamped coils 150a and 150b. In the present embodiment, the stamped coils 150a and 150b collectively refer to coils having coil strands that are formed to be flat. Therefore, the stamped coils 150a and 150b may include a flat type coil or a rectangular copper coil.

The stamped coils 150a and 150b may be formed by press-processing a metal plate, but the method of obtaining the stamped coils 150a and 150b is not limited thereto.

According to an embodiment in which the coil is formed of flat stamped coils 150*a* and 150*b*, the coil may be manufactured by applying only the press-processing method. Thus, the coil may be easily manufactured and the manufacturing cost minimized. Further, because a cross sectional area (i.e., a line width and a thickness) of the coil strand is increased as compared to a case in which the coil pattern is obtained by the wiring of a circuit board, the resistance that occurs from the coil may be significantly reduced. As a result, the performance characteristics of the coil may be improved.

In addition, in a case in which the coil is formed of a general wire, it is difficult to maintain a shape of the coil, but in a case in which the stamped coils 150*a* and 150*b* are used as in the present embodiment, because the shape of the coil is easier to maintain, it may be easier to handle the coil during the manufacturing process.

The stamped coils 150*a* and 150*b* according to the present embodiment may be formed to have a double-layer structure.

A detailed description of the arrangement of the stamped coils 150*a* and 150*b* will be provided below.

Each of the stamped coils 150*a* and 150*b* includes a first section 152 disposed to be adjacent to one surface of the connection substrate 120, a second section 154 disposed to be adjacent to the other surface of the connection substrate 120, and a connection part 156 connecting the first section 152 and the second section 154 to each other.

One end of the first section 152 and one end of the second section 154 are each connected to the first pads 124 of the connection substrate 120. For instance, referring to FIG. 6, one end of the first section 152 is connected to the first pad 124*a* formed on one surface of the connection substrate 120, and one end of the second section 154 is connected to the first pad 124*b* formed on the other surface of the connection substrate 120.

The connection part 156 connects the other end of the first section 152 and the other end of the second section 154 to each other to connect the first section 152 and the second section 154 to each other in a series structure.

Referring to FIG. 5, the coil strand is bent about points at which the connection part 156 joins the first section 152 and the second section 154. Although FIG. 5 illustrates an embodiment in which the connection part 156 is formed by bending a coil strand to be perpendicular to the stamped coils 150*a* and 150*b* of the first and second sections 152 and 154, by way of example, the connection part 156 is not limited thereto. For example, the connection part 156 may also be formed as an oblique inclined surface, or may also be formed as a bent curved surface without the bent portion.

Meanwhile, as the stamped coils 150*a* and 150*b* include the first section 152 and the second section 154, it may be necessary to secure insulation between the first section 152 and the second section 154. Therefore, referring to an embodiment illustrated in FIG. 6, an insulating layer 158 is coated on the surfaces of the stamped coils 150*a* and 150*b*. The insulating layer 158 may be formed of various materials as long as the materials may secure insulation between the first section 152 and the second section 154. In addition, the insulating layer 158 may be formed on a portion of the surfaces of the stamped coils 150*a* and 150*b*, rather than on the entire surfaces thereof.

The first section 152 and the second section 154 of the stamped coils 150*a* and 150*b* are disposed to be spaced apart from each other by a predetermined distance by the connection substrate 120 and the connection part 156.

The first section 152 and the second section 154 of the stamped coils 150*a* and 150*b* according to the present embodiment are connected to each other by the connection part 156 to form a single coil, and the first section 152 and the second section 154 are disposed to face each other. However, the first section 152 and the second section 154 may not be formed to have the same shape.

The first section 152 starting from the first pads 124 on one surface of the connection substrate 120 to be wound toward the center of the coil part and at least one winding may extend to the second section 154 through the connection part 156.

In addition, the second section 154 starting from the connection part 156 to be wound in an opposite direction to the first pads 124 and at least one winding may be connected to the second pads 126 on the other surface of the connection substrate 120.

Accordingly, in an embodiment in which the first section 152 and the second section 154 are projected on a plane, there may be a portion in which the first section 152 and the second section 154 are partially overlapped with each other.

In addition, as the first section 152 and the second section 154 are connected to the first pads 124*a* and 124*b* formed on different surfaces of the connection substrate 120, the first section 152 may be disposed on one surface of the connection substrate 120, and the second section 154 may be disposed on the other surface of the connection substrate 120. In other words, the connection substrate 120 may be interposed between the first section 152 and the second section 154.

The above-mentioned stamped coils 150*a* and 150*b* may be manufactured by forming the first section 152 and the second section 154, respectively, by a pressing process and then connecting portions of the connection part 156 to each other. In this case, the connection part 156 may be adhered using a conductive adhesive, but is not limited thereto. For example, various methods such as a laser welding and the like may be used.

Meanwhile, the coil part 150 according to the present embodiment includes the first stamped coil 150*a*, and the second stamped coil 150*b* disposed outside the first stamped coil 150*a*. However, the coil part 150 is not limited thereto, and third and fourth stamped coils may be further disposed outside the second stamped coil 150*b*.

The stamped coils 150*a* and 150*b* may be used to transmit and receive power for wireless charging. For example, the stamped coils 150*a* and 150*b* may serve as a transmitter coil or a resonant receiver coil for wireless power transmission. However, the applications of the stamped coils 150*a* and 150*b* are not limited thereto. The stamped coils 150*a* and 150*b* may, for example, perform at least one function of radio frequency identification (RFID), near field communications (NFC), and magnetic secure transmissions (MST). In another example, a first stamped coil 150*a* may be used for wireless charging, and a second stamped coil 150*b* may be used for RFID or NFC. Further, more than two stamped coils may be installed in a device such that coils are each used for different functions.

The first stamped coil 150*a* may be disposed in an inner space of the second stamped coil 150*b*.

As such, in the case in which the first stamped coil 150*a* is disposed in the inner space of the second stamped coil 150*b*, it may be difficult to lead both ends of the first stamped coil 150*a* to the outside by the second stamped coil 150*b*.

To this end, the coil assembly 110 according to the present embodiment uses the connection substrate 120.

Both ends of the first stamped coil 150*a* are led to the outside of the coil part 150 through the connection substrate 120. Further, both ends of the second stamped coil 150*b* are also led to the outside of the coil part 150 through the connection substrate 120.

The power receiver 100 according to the present embodiment may form a coil part 150 using flat stamped coils 150*a* and 150*b* without using a coil having a wire form or a substrate form as in the related art, and may lead both ends of the stamped coils 150*a* and 150*b* to the outside using a connection substrate 120 formed of the flexible PCB.

As a result, the line width of the coil may be maximally extended while a thickness of the coil assembly 110 is maintained to be very thin.

Further, the coil assembly 110 according to the present embodiment may be disposed in a double-layer structure in which one coil is divided into a first section 152 and a second section 154, and the first and second sections 152 and 154 may be stacked on each other. Therefore, the coil may be formed to have a desired number of windings while maintaining the line width.

Further, in the coil assembly 110 according to the present embodiment, both ends of the stamped coils 150*a* and 150*b* are each bonded to both sides of the connection substrate 120. When both ends of the stamped coils 150*a* and 150*b* are all bonded to one surface of the connection substrate 120, an end of the second section 154 is disposed on one surface of the connection substrate 120. Thus, there is a high probability of the first section 152 and the second section 154 may be in contact with each other.

However, according to the present embodiment, the first section 152 and the second section 154 are spaced apart from each other based on the thickness of the connection substrate even though the stamped coils 150*a* and 150*b* are formed in the double-layer structure. Thus, the above-mentioned possibility of contact between the first section 152 and the second section 154 is significantly reduced.

The configuration of the coil assembly 110 described above may also be equally applied to the power transmitter 200 included in the charging device 20. Therefore, a description of a coil assembly of the power transmitter 200 will be omitted.

Meanwhile, the present disclosure is not limited to the embodiments described above, and may be variously modified.

The coil assembly 110 according to an embodiment to be described below has a structure similar to that of the coil assembly 110 (FIG. 3) according to the embodiment described above, and has a difference only in a connection part or an insulation structure. Therefore, the same reference numerals will be used with respect to the same components as those described above, a detailed description thereof will be omitted, and configurations having the difference will be mainly described.

Figure 7:
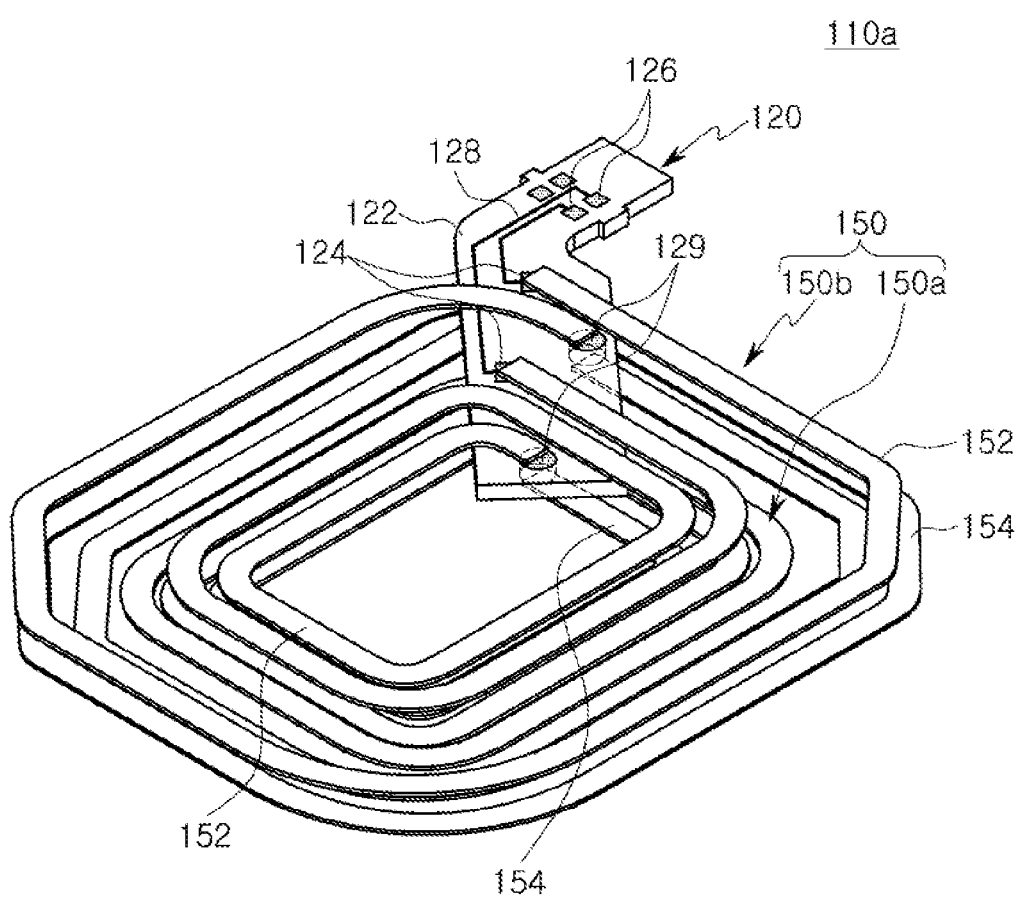
FIG. 7 is a perspective view schematically illustrating another embodiment of a coil assembly according to the present disclosure.

FIG. 7 is a perspective view schematically illustrating a coil assembly according to another embodiment in the present disclosure.

Referring to FIG. 7, a coil assembly 110*a* according to the present embodiment may include the flexible PCB 112 of a thin film, and the coil part 150 including the plurality of stamped coils 150*a* and 150*b*, as in the embodiment described above.

The stamped coils 150*a* and 150*b* according to the present embodiment may not form the connection part by bonding the first and second sections 152 and 154 to each other, but may connect the first and second sections 152 and 154 to each other through a conductive via 129 formed in the connection substrate 120.

Therefore, the first section 152 of the stamped coils 150*a* and 150*b* may be connected to one end of the conductive via 129 exposed to one surface of the connection substrate 120, and the second section 154 may be connected to the other end of the conductive via 129 exposed to the other surface of the connection substrate 120.

In this case, because the stamped coils 150*a* and 150*b* may be manufactured and used in a two-dimensional structure, which is a plane structure, it is possible to easily manufacture the stamped coils 150*a* and 150*b* and to reduce the production cost thereof. Further, the resulting coil assembly is thin and suitable for installation in a portable terminal.

Figure 8:
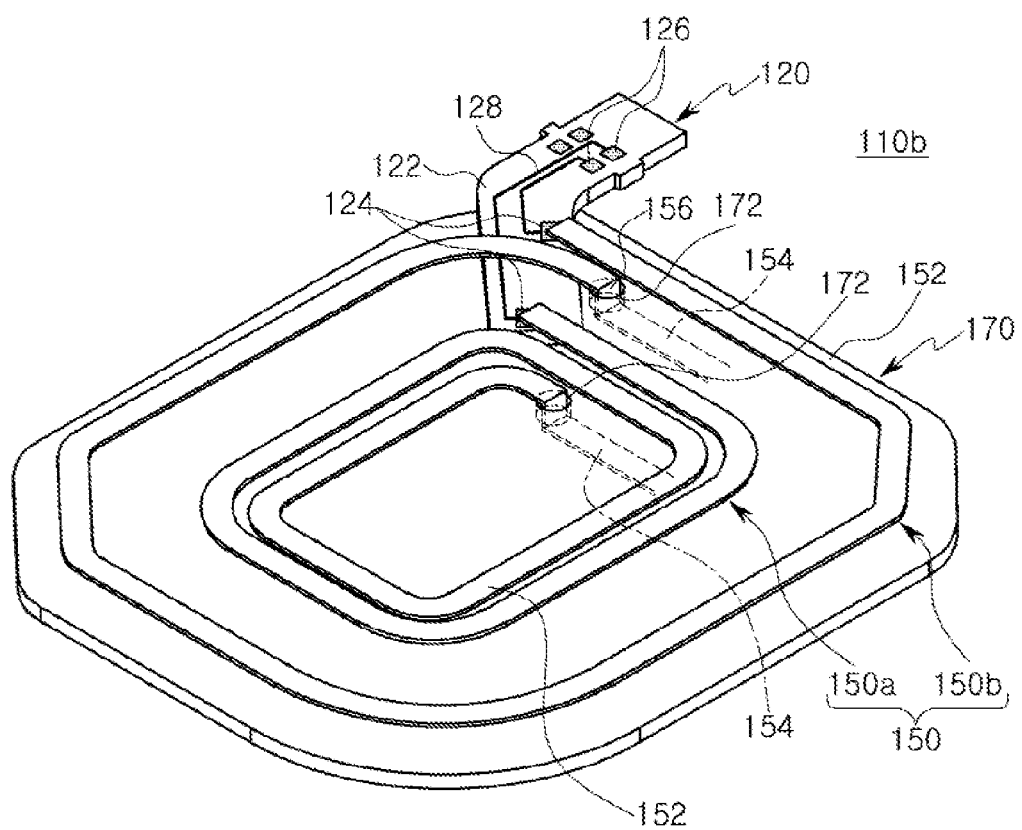
FIG. 8 is a perspective view schematically illustrating another embodiment of a coil assembly according to the present disclosure.

FIG. 8 is a perspective view schematically illustrating another embodiment of a coil assembly according to the present disclosure, wherein only a portion of the second stamped coil 150*b* is illustrated for convenience of explanation.

Referring to FIG. 8, a coil assembly 110*b* according to the present embodiment includes the flexible PCB 112 of a thin film, the coil part 150 including the plurality of stamped coils 150*a* and 150*b*, and an insulting substrate 170, as in other embodiments described above.

The stamped coils 150*a* and 150*b* according to the present embodiment may not include the insulating layer 158 illustrated in FIG. 6 that is formed on the surfaces of the stamped coils 150*a* and 150*b*. In addition, instead of the insulating layer, the stamped coils 150*a* and 150*b* include the insulating substrate 170 interposed between the first section 152 and the second section 154 thereof. Therefore, the first section 152 and the second section 154 of the stamped coils 150*a* and 150*b* may be each attached to both sides of the insulating substrate 170 to be formed integrally with the insulating substrate 170.

In this embodiment, the insulating substrate 170 may have flexibility or rigidity, and may be formed of a thin plate of an insulating material such as a film.

Further, the insulating substrate 170 includes a plurality of openings 172 in which the connection part 156 of the stamped coils 150*a* and 150*b* is disposed. Therefore, the connection part 156 penetrates through the openings 172 and connects the first section 152 and the second section 154 of the stamped coils 150*a* and 150*b* to each other.

Because the manufacturing process for the coil assembly 110 according to FIG. 8 does not involve forming the insulating layer 158 on the surfaces of the stamped coils 150*a* and 150*b*, it is possible to easily manufacture the stamped coils 150*a* and 150*b* and to reduce the production cost thereof. Further, because the stamped coils 150*a* and 150*b* are attached to the insulating substrate 170, the stamped coils 150*a* and 150*b* may be fixed onto the insulating substrate 170, whereby it may be easy to handle the stamped coils 150*a* and 150*b* during the manufacturing process.

Meanwhile, the present embodiment includes both the connection substrate 120 and the insulating substrate 170, but the configuration of the present disclosure is not limited thereto. For instance, in another embodiment, the insulating film 122 of the connection substrate 120 may be extended to be also used as the insulating substrate 170.

The coil assembly and the electronic device having the same according to the present disclosure described above are not limited to the illustrated embodiments described above, and may be variously applied. For example, although an embodiment in which contact pads of the coil assembly are disposed in the same direction of the substrate is described above as an example, the contact pads of the coil assembly may be variously applied in another embodiment. For example, the contact pads of the coil assembly may be disposed on both sides of the substrate.

Further, while an embodiment of the coil assembly described above may be included in a portable device to receive power, the coil assembly may be also used in a power transmitter of a charging device 20.

Further, the coil assembly according to the present disclosure is not limited thereto, and may be widely applied to an electronic component or an electronic device in which the coil is used such as a transformer, a motor or the like.

As in the embodiment described above, a coil assembly may use stamped coils, without using a coil of a wire shape or a coil of a circuit pattern shape as in the related art. As a result, the line width of the coil may be maximally extended while the thickness of the coil assembly is maintained to be very thin.

Further, according to one embodiment, the coil assembly may be disposed in the double-layer structure in which one coil is divided into the first section and the second section, and the first and second sections are stacked on each other. Therefore, the coil may be formed to have the desired number of windings while maintaining the line width.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil assembly comprising:
    a coil part comprising stamped coils; and
    a connection substrate having one end thereof disposed inside the coil part and the other end disposed outside the coil part,
    wherein one end of each of the stamped coils is connected to a first surface of the connection substrate and the other end is connected to a second surface of the connection substrate.

2. The coil assembly of claim 1, wherein the connection substrate comprises
    first pads disposed adjacent to the one end of the connection substrate and connected to the stamped coils;
    second pads disposed adjacent to the other end of the connection substrate and connected to external members; and
    wiring patterns connecting the first pads and the second pads to each other.

3. The coil assembly of claim 2, wherein the first pads are distributed on both sides of the connection substrate,
    the second pads are disposed on only one side of the connection substrate.

4. The coil assembly of claim 1, wherein the stamped coils comprise a first section disposed adjacent to the first surface of the connection substrate in a spiral shape; and
    a second section that extends from the first section and is disposed adjacent to the second surface of the connection substrate in the spiral shape.

5. The coil assembly of claim 4, wherein the stamped coils have a double-layer structure in which the first section and the second section are stacked and are disposed to partially overlap each other.

6. The coil assembly of claim 4, wherein the stamped coils comprise an insulating layer coated on surfaces of the stamped coils in order to secure insulation between the first section and the second section.

7. The coil assembly of claim 4, wherein the connection substrate comprises an insulating substrate interposed between the first section and the second section to secure insulation between the first section and the second section.

8. The coil assembly of claim 4, wherein the connection substrate is interposed between the first section and the second section to secure insulation between the first section and the second section, and comprises at least one conductive via connecting the first section and the second section to each other.

9. The coil assembly of claim 1, wherein the connection substrate comprises an insulating film and pads disposed on both sides of the insulating film.

10. The coil assembly of claim 1, wherein the coil part comprises
    a second stamped coil; and
    a first stamped coil disposed in an inner space of the second stamped coil.

11. A coil assembly comprising:
    a coil part comprising stamped coils; and
    a connection substrate having one end thereof disposed inside the coil part and the other end disposed outside of the coil part,
    wherein each of the stamped coils is formed in a double-layer structure comprising a first section disposed adjacent to a first surface of the connection substrate and a second section disposed adjacent to a second surface of the connection substrate.

12. The coil assembly of claim 11, wherein the stamped coils further comprise a connection part that connects between an end of the first section and an end of the second section.

13. The coil assembly of claim 12, wherein the connection part is disposed perpendicular to the first section or the second section.

14. A coil assembly comprising:
    a coil part comprising stamped coils stacked in two or more layers; and
    a connection substrate comprising a first end disposed outside of the coil part and a second end disposed between the two or more layers of the stamped coils to connect with one or more ends of the stamped coils,
    wherein the connection substrate comprises a flexible printed circuit board or a film substrate.

15. The coil assembly of claim 14, wherein the connection substrate is configured to electrically connect to a secondary battery of an electronic device for wirelessly charging the secondary battery.

16. The coil assembly of claim 14, wherein the stamped coils comprise a first section that extends to a first surface of the connection substrate and a second section that extends to a second surface of the connection substrate.

17. The coil assembly of claim 14, further comprising an insulating substrate interposed between a first section of at least one of the stamped coils and a second section of the at least one of the stamped coils.

18. A wireless power receiver comprising the coil assembly of claim 14, wherein the coil assembly is configured to serve as a resonant receiver coil for wirelessly charging a portable terminal.

* * * * *